Jan. 29, 1963

A. G. WEYRICH 3,076,165

BOBBIN AND TERMINAL LUG CONSTRUCTION FOR USE WITH PRINTED CIRCUITS

Filed Sept. 6, 1960

INVENTOR:

Arthur G. Weyrich,

BY Bair, Freeman & Molinare

ATTORNEYS.

United States Patent Office 3,076,165

Patented Jan. 29, 1963

3,076,165

BOBBIN AND TERMINAL LUG CONSTRUCTION FOR USE WITH PRINTED CIRCUITS

Arthur G. Weyrich, Chicago, Ill., assignor to Amerline Corporation, a corporation of Illinois Filed Sept. 6, 1960, Ser. No. 54,035
2 Claims. (Cl. 339—17)

This invention relates generally to bobbin and terminal lug constructions, and more particularly, to new and improved bobbin and terminal lug constructions which are particularly adapted for use with printed circuit boards.

In the manufacture of electrical components, the use of bobbins for supporting various types of wire coils has been widely adopted, and the manufacture of such bobbins in large quantities and at low cost has become increasingly important. As a result, it has become conventional to utilize molded and plastic parts for such bobbins, and metal terminals for the wire coils have been secured thereto in a variety of manners.

With increasingly widespread use of printed circuitry in electrical apparatus such plastic bobbin and metal terminal assemblies have been supported upon and electrically connected to printed circuit boards in a number of different constructions, such as television receivers, amplifier chassis, and the like. However, the bobbin assemblies of the prior art have not proved entirely satisfactory for use with printed circuit boards with respect to the rapid and trouble-free assembly of the components into a finished composite structure.

It is a primary object of this invention, therefore, to provide a new and improved bobbin and terminal lug assembly which is particularly adapted for use with a printed circuit board.

It is another object of this invention to provide an improved coil bobbin for use with a printed circuit board wherein the bobbin is formed with particularly oriented molded receptacles to locate and accurately align the terminal lugs with the slots in a printed circuit board.

It is still another object of this invention to provide an improved coil bobbin of thermoplastic resinous material having molded receptacles for accurately aligning rigid terminal lugs which are adapted to be securely positioned within said receptacles and then bent over to allow a coil to be wound on said bobbin to provide a prefabricated assembly suitable for ready connection to a printed circuit board.

It is a further object to provide a new and improved coil bobbin and terminal lug assembly for connection with a printed circuit board which is characterized by its efficiency, its relative simplicity of construction and assembly and its ready adaptability to high quantity production.

Further objects and advantages of this invention will become apparent as the following description proceeds, and the features of novelty which characterize this invention will be pointed out with particularity in the claims annexed to and forming a part of this specification. A preferred embodiment of the invention is shown in the accompanying drawing in which:

Figures 1, 2:
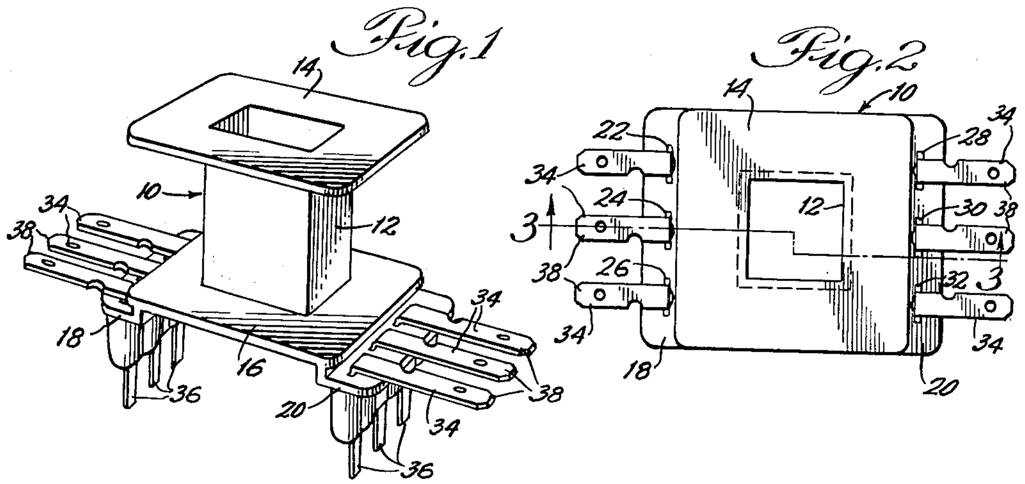
FIGURE 1 is a perspective view of a combination bobbin and terminal lug construction embodying the principles and features of the present invention, showing the terminal lugs positioned in pre-oriented molded receptacles which are matched to the slots in the printed circuit board.
FIGURE 2 is a top plan view of a bobbin and terminal lug construction of FIGURE 1 prior to being plugged into a printed circuit board.

Referring now to the drawing and more particularly to FIGURES 1 to 5 thereof, we have indicated generally at 10 in FIGURE 1 a bobbin adapted to support the winding of electrical coil or similar component. Advantageously, the bobbin 10 may be formed as a unitary and integral part of molded nylon or similar moldable resinous composition of the type characterized by high impact strength for winding of metal wires thereon at high speeds, low coefficient of friction with metals to eliminate the need for lubricants in use, a tough and horny surface for durability, and high temperature resistance for enabling soldering operations to be performed in immediately adjacent relationship thereto. Preferably, the material forming the bobbin should be sufficiently rigid and sturdy so as to provide good support and durability, while at the same time being capable of penetration by gripping engagement by sharp metal edges in connection with the mounting therein of barbed terminal lugs.

Figure 3:
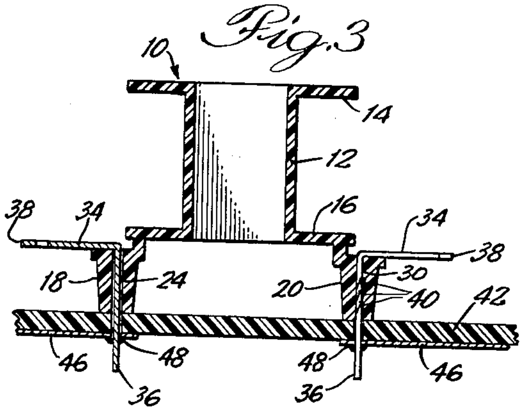
FIGURE 3 is a cross-sectional view of the bobbin and terminal lug construction taken substantially as shown along line 3—3 of FIGURE 2 with the terminal lugs positioned through the slots in the printed circuit board and electrically connected to the printed circuit thereon.

The bobbin 10 comprises a hollow center hub 12 having an opposed pair of face flanges 14 and 16 integral therewith at its opposite ends. Those skilled in the art will appreciate that the particular proportions of the hub and face flanges may be varied greatly without in any way departing from the principles of the present invention, and the particular bobbin 10 illustrated in the drawing is intended merely to be representative. A pair of anchor bosses 18 and 20 are formed along opposite edges of the face flanges 16 as projecting enlargements therefrom. The bosses 18 and 20 preferably are of substantially greater material thickness than the face flange 16 so as to provide adequate body strength for the mounting of terminal lugs therein. A typical orientation of the anchor bosses 18 and 20 is shown in FIGURES 1 and 3 of the drawing wherein the bosses depend downwardly from the face flange 16 and substantially perpendicular to its plane. It will be understood, however, that the bosses 18 and 20 may equally well be located in any relative orientation on the same face flange, or may be provided on each of the opposite face flanges, if desired.

Each of the anchor bosses 18 and 20 is particularly formed with a plurality of receptor cavities, as illustrated at 22, 24, 26, 28, 30 and 32. Each receptor cavity defines an opening which extends through its anchor boss to permit a terminal lug to be inserted therethrough, with the ends of the terminal lug being exposed for the electrical connection of a coil wire or printed circuit thereto. It will be noted from FIGURE 3 of the drawing that each of the receptor cavities is within an anchor boss which tapers slightly inwardly toward the bottom wall thereof to facilitate the molding of the bobbin assembly.

The terminal lugs which are positioned through the anchor bosses 18 and 20, are exemplified by the terminal lug 34. The terminal lug 34 comprises an elongated, rigid metal lug which includes a stem or shank portion 36 adapted to be securely positioned within the receptor cavity of an anchor boss and a head portion 38 which is adapted to be soldered or otherwise electrically connected to one terminal of the wire coil wound around the bobbin. In accordance with a feature of this invention, each terminal lug 34 is formed as a straight piece such as by stamping a continuous end-to-end series from a strip of ribbon conductive material. Each terminal lug is positioned within the bobbin by inserting its shank end 36 into a receptor cavity of an anchor boss and the head end portion 38 of the terminal lug then is bent over away from the bobbin and anchor boss so as to be substantially perpendicular to its shank portion 36. In this manner, as illustrated in FIGURES 1 and 3 of the drawing, the head end portions of the terminal lugs are bent away from the hollow central hub 12 of the bobbin to readily permit the winding of an electrical coil therearound.

Figure 4:
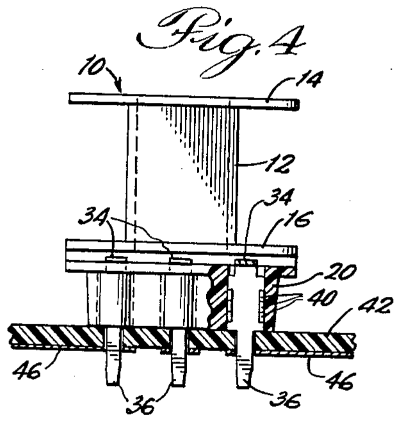
FIGURE 4 is an end, elevational view, partly fragmentary and in cross-section, showing the assembly of FIGURE 3 before electrical connection is made between the terminal lugs and the printed circuit.
Figure 5:
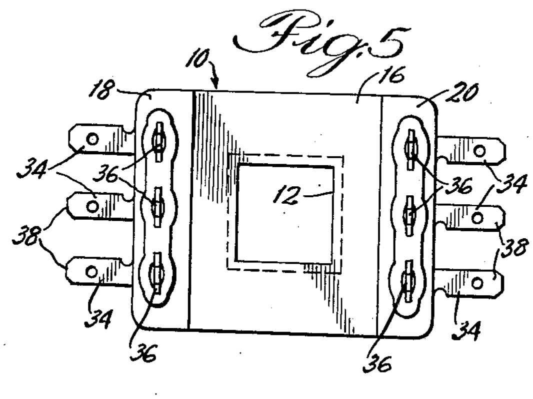
FIGURE 5 is a bottom plan view of the construction of FIGURE 1.

Advantageously, each of the terminal lugs 34 is provided with a shank portion 36 that is particularly formed with a plurality of tapered barbs 40, as illustrated in FIGURES 3 and 4 of the drawing. Advantageously, the barbs may be arranged in reverse tapered pairs at opposite edges of the shank 36 which are displaced laterally outwardly from the general plane of the terminal lug in opposite directions therefrom. Since the reverse tapered barbs terminate in generally horizontally extending gripping edges, it will be apparent that the shank end portion 36 of each terminal lug 34 is adapted to be forced into the internal wall surfaces of the receptor cavities within the anchor bosses of the bobbin. When the terminal lugs are inserted in the manner described above, the edges of the reverse tapered barbs effect a cutting into and a fixed gripping engagement with the internal wall surfaces of the receptor cavity to securely lock the terminal lugs therewithin in a "fish-hook" manner.

In accordance with the invention, when the terminal lugs 34 thus are inserted and permanently locked within the receptor cavities of the anchor bosses, the shank end portion 36 of each terminal lug extends downwardly from its respective anchor boss to form a male plug or prong member. Due to the rigidity of the terminal lugs themselves and due to the added strength furnished by the construction of the anchor bosses 18 and 20, the shank end portions 36 of the terminal lugs comprise rigid prong members adapted to be plugged into a suitable receptacle.

Figure 6:
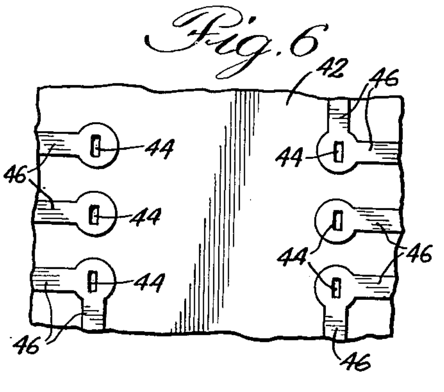
FIGURE 6 is a fragmentary view of a section of a printed circuit board illustrating the lug receiving slots and printed circuitry provided thereon.

As explained hereinabove, it is a feature of this invention that the anchor bosses 18 and 20 are formed with pre-oriented molded receptacle cavities which match the slots in a printed circuit board to enable the bobbin and terminal lug assembly to readily be plugged into the printed circuit board whereby the terminal lugs extend through the slots for mechanical and electrical connection to the printed circuit. FIGURE 6 of the drawing illustrates a printed circuit board 42 having a plurality of slots 44 extending therethrough, which slots are in contacting relation with suitable printed circuit conductors

46. Since the pre-oriented molded locations of the receptacle cavities are matched to the slots 44 in the printed circuit board 42, the shank end portions 36 of the terminal lugs can readily be plugged into the slots 44 with little difficulty. Those familiar with the prior art problems arising from the use of wire terminals and printed circuit boards will appreciate the great advance rendered by the novel construction of the invention. In the past, stiff wires were used which were capable of pointing in various directions. This considerably complicated the assembly of a bobbin to a printed circuit board. With the present invention, the terminal lugs are accurately aligned with the slots in the printed circuit board and the assembly is a relatively simple and quickly finished job.

FIGURE 4 illustrates the invention immediately after the bobbin assembly 10 has been plugged into the printed circuit board 42. When this operation is complete, the entire assembly may be dipped into a solder pot, in accordance with known printed circuit techniques, and all of the electrical connections are made at one time and in one operation. This is illustrated in FIGURE 3 of the drawing which shows the solder joints 48 mechanically and electrically connecting the terminal lug to the printed circuit.

It now will be apparent to those skilled in the art that the invention provides a low cost and high speed production technique for manufacturing bobbin and printed circuit assemblies in mass quantities. The invention permits the bobbin assembly to be molded as an integral unit and the terminal lugs to be positioned therein in the proper prealigned relationship. The bobbins, as thus assembled, may be supplied to a coil winder for the winding of the wire coils around the bobbin. This assembly then may be furnished to an electrical apparatus manufacturer who plugs the coil and bobbin assembly into the printed circuit board for the final operation of soldering.

While there has been shown and described a particular illustrative embodiment of the invention, it will be obvious to those skilled in the art that various changes and modifications may be made therein without departing from the invention, and therefore, it is intended in the appended claims to cover all such changes and modifications as fall within the true spirit and scope of the invention.

What I claim as new and desire to secure by Letters Patent of the United States is:

1. A bobbin, terminal lug and printed circuit board assembly comprising, in combination, a molded bobbin having a central hub and spaced opposed face flanges; molded anchor boss means secured to at least one of said face flanges, said anchor boss means being formed with pre-oriented molded receptacle cavities adapted to receive terminal lugs therein; elongated rigid terminal lugs securely positioned within said molded receptacle cavities, each of said lugs having a rigid, planar shank end providing a plurality of reverse tapered barbs at the opposite edges thereof in gripping engagement with the internal wall surfaces of said molded receptacle cavities, said receptacle cavities being formed with cross-sectional dimensions only slightly larger than the cross-sectional dimensions of the lug shank ends to result in a tight and rigid fit therebetween, one end of each of said terminal lugs being bent outwardly away from said central hub to permit a wire coil to be wound around said central hub; and a printed circuit board having a printed circuit on at least one side thereof and defining a plurality of slots extending through said board, at least some of said slots being arranged in a pattern matching said pre-oriented molded receptacle cavities to enable said bobbin and terminal lug assembly to readily be plugged into said printed circuit board whereby the terminal lugs extend through said slots for mechanical and electrical connection to the printed circuit.

2. A bobbin and terminal lug assembly comprising, in combination, a molded bobbin having a central hub and spaced opposed face flanges; molded anchor boss means secured to at least one of said face flanges, said anchor boss means being formed with molded receptacle cavities adapted to receive rigid terminal lugs therein; elongated rigid terminal lugs securely positioned within said molded receptacle cavities, each of said lugs having a rigid, planar shank end providing a plurality of reverse tapered barbs at the opposite edges thereof in gripping engagement with the internal wall surfaces of said molded receptacle cavities, each of said molded receptacle cavities being formed with cross-sectional dimensions only slightly larger than the cross-sectional dimensions of the lug shank end to result in a tight rigid fit therebetween, said planar shank end being positioned in parallel with the axis of said central hub; and the other end of each of said terminal lugs being bent outwardly away from said shank end and said central hub to permit a wire coil to be wound around said central hub.

References Cited in the file of this patent

UNITED STATES PATENTS

| | | |
|---|---|---|
| 2,649,558 | Franz | Aug. 18, 1953 |
| 2,734,177 | Gilbert | Feb. 7, 1956 |
| 2,790,961 | Del Camp | Apr. 30, 1957 |